Sept. 9, 1941.   V. W. LEUSCH   2,255,222

WEED GUARD FOR FISHING LURES

Filed April 19, 1940

INVENTOR.
VICTOR WILLIAM LEUSCH.
BY
Oltsch & Knoblock
ATTORNEYS.

Patented Sept. 9, 1941

2,255,222

UNITED STATES PATENT OFFICE 2,255,222

WEED GUARD FOR FISHING LURES

Victor William Leusch, South Bend, Ind., assignor to South Bend Bait Company, South Bend, Ind., a corporation of Indiana Application August 19, 1940, Serial No. 353,214

4 Claims. (Cl. 43—39)

This invention relates to weed guards for fishing lures, and has for its primary object to provide a weed guard which is of novel, simple and inexpensive construction.

A further object is to provide a weed guard which is adapted to be releasably locked on the point of a fish hook by spring pressed engagement thereof with said hook.

A further object is to provide a weed guard normally spring locked in operative relation to the tip portion of a hook, and releasable when a fish strikes the same to prevent interference with hooking of the fish.

A further object is to provide a weed guard formed of a piece of spring wire with one end thereof bent in loop form for spring locked engagement with the point of a fish hook.

A further object is to provide a weed guard formed of wire bent in a loop at one end, with a portion of the loop bent downwardly in U-form in a plane substantially perpendicular to the stem of the weed guard.

A further object is to provide a resilient weed guard with a retainer engageable with the point of a hook and including laterally upwardly diverging portions for guiding the weed guard to operative position with relation to the hook after release thereof from disengaging stress.

A further object is to provide a fishing lure comprising a spoon having a hook fixed thereon, and a weed guard secured to the front of the spoon and extending longitudinally thereof for spring pressed locking engagement with the pointed end of the hook.

Other objects will be apparent from the description and appended claims.

Figure 1:
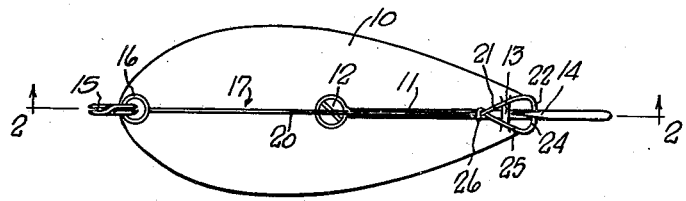
Fig. 1 is a plan view of a fishing lure provided with my improved weed guard.

Referring to the drawing, which illustrates the preferred embodiment of the invention, the numeral 10 designates a fishing spoon of any desired size, shape and configuration. A fish hook having its shank 11 extending longitudinally of the spoon 10 is fixedly secured thereto at its eye by means of screw 12 passing through said eye and threaded into the spoon at an intermediate point along the length thereof. The shank of the hook is curved in substantial conformity with the curvature of the spoon and passes beneath a retainer 13 struck from the plate adjacent the rear end thereof. The screw 12 and the retainer 13 serve to fixedly position the hook with relation to the spoon. The pointed end portion 14 of the hook preferably extends upwardly and terminates above the rear end of the concave face of the spoon 10. A suitable line attaching member 15, in the nature of a split ring or the like, is connected with the front end of the spoon 10, as by means of a hollow or tubular rivet 16 passing through the spoon.

The weed guard 17 is formed of spring wire having a loop 18 formed at one end thereof and adapted to be secured to the spoon 10 by means of rivet 16. A short straight run 19 extends from the loop 18 at a slight angle to the plane of said loop, and an elongated stem portion 20 extends at a slight angle to portion 19. The opposite end of the weed guard is provided with a suitable retainer formed from a run 21 extending at an angle both outwardly and upwardly from stem 20, a downwardly and inwardly extending guide portion 22, a downwardly extending substantially U-shaped intermediate retainer portion 23, an outwardly upwardly extending guide portion 24 complementary to guide portion 22, a forwardly downwardly and inwardly extending portion 25 complementary to portion 21, and terminates in a bend 26 securing the end of the loop at the junction of the stem 20 and portion 21.

Figure 2:
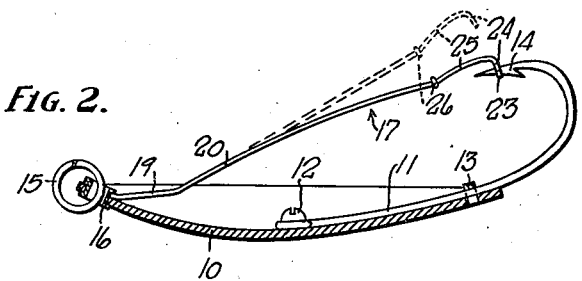
Fig. 2 is a longitudinal sectional view taken on line 2—2 in Fig. 1.
Figure 3:
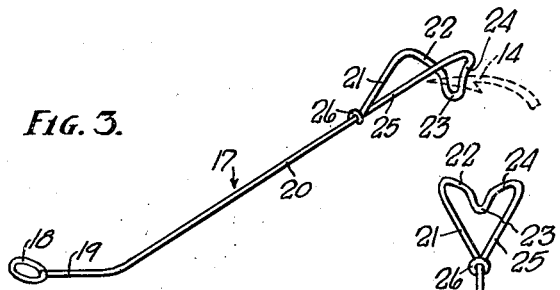
Fig. 3 is an enlarged perspective view of the weed guard.
Figure 4:
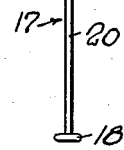
Fig. 4 is an enlarged front elevational view of the weed guard.

The bends between loop 18, run 19 and stem 20 are preferably such that the rear free end of the weed guard, when released, will be positioned in spaced relation above the pointed end 14 of the fish hook 11 as best illustrated in dotted lines in Fig. 2. The formation of the weed guard from spring wire permits the same to be readily manipulated and flexed to position its rear loop portion below the pointed end portion of the fish hook, whereby the U-shaped retainer portion 23 thereof may fit around the pointed end 14 of the fish hook, and hence hold the weed guard in operative relation to the hook. It will be observed that when the weed guard is engaged with the hook, the portions 21, 25 thereof are angularly upwardly positioned forwardly of the tip or point of the hook and extend above the pointed end portion of the hook. Hence any obstacle which is struck by the weed guard is deflected by portions 21 and 25 and is prevented from engaging the point of the fish hook under normal fishing conditions.

In instances where impact between the weed guard and an obstacle causes the weed guard to be deflected or displaced from its spring pressed locking engagement with the hook, this locking engagement will normally be restored as soon as the fishing lure passes the obstacle. In this connection it will be observed that the lateral extension of the parts 22 and 24 serves to guide the weed guard in its spring pressed return movement to operative locked relation with the fish hook. Hence, if there is a component of lateral movement of the weed guard, in addition to movement in direction of the hook shank, the spring pressed return of the weed guard will result in the striking of the pointed portion of the fish hook by one of the portions 22 and 24, and the bodily deflection of the weed guard by sliding of that one of portions 22 and 24 which is so struck on the pointed end portion of the fish hook so that the weed guard will be guided for engagement of the retainer portion 23 thereof with the pointed end portion of the hook. Hence the weed guard is adapted for release from operative locked engagement with the hook, but is provided with guide means for assuring its return to operative position. This assures the angler, under usual fishing conditions, that his weed guard is operative at all times and will not be released by the first obstacle which it strikes.

When a fish strikes the lure and bites thereon, the weed guard will flex in the direction of the spoon so that it occasions no interference with the catching of the fish. Also, the weed guard may be disengaged from the hook by simply flexing the weed guard downwardly out of engagement with the hook and then laterally around the hook to the dotted line position in Fig. 2.

The device permits the angler to vary the tension of the locking engagement between the weed guard and the fish hook at will. Specifically, the angular position of the stem 20 and run 19 with relation to each other and to the loop 18 and the spoon, may be varied by simply bending the wire. Therefore, if the weed guard is accidentally bent in use it may be restored to full operative condition very simply and quickly.

Figure 5:
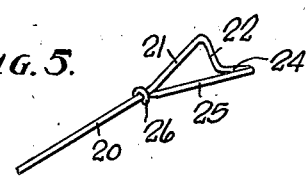
Fig. 5 is a fragmentary perspective view of a modified embodiment of the invention.

The spacing of the opposite sides of the U-shaped retainer portion is preferably approximately equal to the width of the hook portion around which it fits, so that the hook will be received below the guide portions 22 and 24. This prevents lateral play of the weed guard, so that strictly lateral deflecting stresses will not displace or release the weed guard from the hook. If desired, the retainer portion 23 may be eliminated by simply forming a V-shaped retainer between portions 22 and 24 as illustrated in Fig. 5, though this provides a spring interlock with the hook which is not quite as effective as the preferred form.

I claim:

1. A weed guard for a fishing lure having a hook fixedly mounted thereon, comprising an elongated resilient member adapted to be secured to said lure at one of its ends and having a hook engaging portion at its opposite end, said hook engaging portion comprising a depending socket releasably fitting around said hook to prevent lateral disengagement therewith, and angularly upwardly and outwardly extending guide portions on opposite sides of said socket.

2. A weed guard for a fishing lure having a hook fixed thereto comprising an elongated resilient member adapted to be secured to said lure at one end, the opposite end of said member carrying a U-shaped hook-engaging portion bent substantially perpendicularly to said member and provided with laterally and upwardly diverging portions at opposite sides thereof extending forwardly of and above the point of said hook.

3. A weed guard comprising a spring wire member bent to form a securing eyelet at one end, the opposite end of said member being bent with its end portion interlocked with an intermediate portion thereof, said bent portion including a pair of runs diverging laterally from said interlock, a pair of downwardly inwardly extending guide runs extending from the outer ends of said diverging runs, and a depending U-shaped hook socket extending between the inner ends of said guide runs.

4. A weed guard comprising a resilient stem, a connector at one end of said stem, and a hook engaging portion at the other end of said stem, said hook engaging portion including a substantially perpendicularly downwardly off-set hook receiving socket having opposed portions extending in substantially parallel relation at opposite sides of and substantially perpendicular to said hook and laterally outwardly extending portions diverging angularly upwardly from said receiver.

VICTOR WILLIAM LEUSCH.